United States Patent [19]

Shimizu

[11] Patent Number: 5,295,160
[45] Date of Patent: Mar. 15, 1994

[54] APPARATUS FOR FM-MODULATION OF DIGITAL SIGNALS

[75] Inventor: Hiroyuki Shimizu, Tokyo, Japan

[73] Assignee: NEC Corporation, Japan

[21] Appl. No.: 891,413

[22] Filed: May 29, 1992

[30] Foreign Application Priority Data

May 30, 1991 [JP] Japan .................................. 3-127657

[51] Int. Cl.$^5$ ...................... H04L 27/10; H04L 27/12; H03C 3/00; H03K 7/06
[52] U.S. Cl. ........................................ 375/47; 375/45; 375/62; 375/64; 332/100
[58] Field of Search ..................... 375/45, 47, 62, 64, 375/65; 332/100, 101, 102, 117; 455/42, 43, 44, 45

[56] References Cited

U.S. PATENT DOCUMENTS 4,390,987  6/1983  Best .................................... 370/112
4,584,540  4/1986  DuBose et al. ........................ 375/64

Primary Examiner—Curtis Kuntz
Assistant Examiner—Duane Kobayashi
Attorney, Agent, or Firm—Ostrolenk, Faber, Gerb & Soffen

[57] ABSTRACT

One of a reference phase signal and an orthogonal phase signal is inverted to provide an inverted phase signal. when an arrangement of a local frequency is the same between transmitting and receiving sides, a carrier wave signal is FM-modulated by the reference and orthogonal phase signals. On the other hand, when the above arrangement is different between the transmitting and receiving sides, a carrier wave signal is FM-modulated by the inverted phase signal and the remaining one of the reference and orthogonal phase signals.

4 Claims, 6 Drawing Sheets

FIG.9

| TIME SLOT : | 0 | 1 | 2 | 3 | 4 | 5 | 6 | 7 | 8 | 9 | 10 | - - - |
|---|---|---|---|---|---|---|---|---|---|---|---|---|
| (a) A : | 1 | 0 | 0 | 1 | 0 | 0 | 0 | 1 | 1 | 0 | | - - - |
| (b) { I : | 1 | 0 | 1 | 1 | 1 | 1 | 0 | 0 | 0 | 1 | 0 | - - - |
| Q : | 1 | 1 | 1 | 0 | 1 | 0 | 0 | 1 | 0 | 0 | 0 | - - - |
| (c) { Ī : | 0 | 1 | 0 | 0 | 0 | 0 | 1 | 1 | 1 | 0 | 1 | - - - |
| Q : | 1 | 1 | 1 | 0 | 1 | 0 | 0 | 1 | 0 | 0 | 0 | - - - |
| (d) B= Ā : | 0 | 1 | 1 | 0 | 1 | 1 | 1 | 0 | 0 | 1 | | - - - |

APPARATUS FOR FM-MODULATION OF DIGITAL SIGNALS

FIELD OF THE INVENTION

This invention relates to a modulation apparatus, and more particularly to, an apparatus for FM-modulation of digital data signals used for a communication, for instance, between a fixed base station and a mobil station.

BACKGROUND OF THE INVENTION

One type of a conventional apparatus for FM-modulation of digital signals comprises a signal separating circuit for separating an input digital data signal into two digital data signals, a waveform shaping circuit for converting the two digital data signals to a reference phase signal (defined "I signal⇌ hereinafter) and an orthogonal phase signal (defined "Q signal⇌ hereinafter) in accordance with the waveform shaping thereof, and an orthogonal modulation circuit for modulation of a carrier wave signal in accordance with the I and Q signals to generate a digital FM-modulation signal.

In operation, the input digital data signal is separated into the two digital data signals by the signal separating circuit, and is simultaneously subject to logic processing of the signal in which the differential conversion, the prohibition processing for a specified data input, etc. are carried out. The two digital data signals of a rectangle waveform are shaped to realize MSK modulation in the subsequent orthogonal modulation by a filter of the waveform shaping circuit, so that the I and Q signals are obtained therein. In the orthogonal modulation circuit, the carrier wave signal is modulated by the I signal, while the carrier wave signal which is phase-shifted by $\pi/2$ is modulated by the Q signal, and the respective modulated signals are combined to provide the digital FM-modulation signal.

However, the conventional apparatus for modulation of digital data signals has a disadvantage in that a content of a received digital FM-modulation signal may be inverted dependent on the arrangement of a local signal in an RF band, when the received digital FM-modulation signal is demodulated, although the detailed reasons will be explained later.

SUMMARY OF THE INVENTION

Accordingly, it is an object of the invention to provide an apparatus for FM-modulation of digital data signals in which the data inversion is avoided in the demodulation of the digital data signal on the receiving side.

According to the invention, an apparatus for FM-modulation of digital data signals, comprises:

means for supplying reference and orthogonal phase signals by receiving an input digital data signal;

means for inverting the reference phase signal to provide an inverted reference phase signal;

means for selecting one signal from the reference phase signal and the inverted reference phase signal; and means for FM-modulating a carrier wave signal by the one signal and the orthogonal phase signal to provide an FM-modulated digital data signal;

wherein the one signal is the reference phase signal in case where an arrangement of a local frequency is the same between transmitting and receiving sides, and the one signal is the inverted reference phase signal in case where the arrangement of the local signal is different between the transmitting and receiving sides.

BRIEF DESCRIPTION OF THE DRAWINGS

The invention will be explained in more detail in conjunction with appended drawings, wherein:

FIG. 9 is an explanatory diagram showing rows of digital data signals in the first preferred embodiment.

DESCRIPTION OF THE PREFERRED EMBODIMENTS

Before explaining an apparatus for FM-modulation of digital data signals in a first preferred embodiment according to the invention, the aforementioned conventional apparatus for FM-modulation of digital data signals will be explained in FIGS. 1 to 7.

Figure 1:
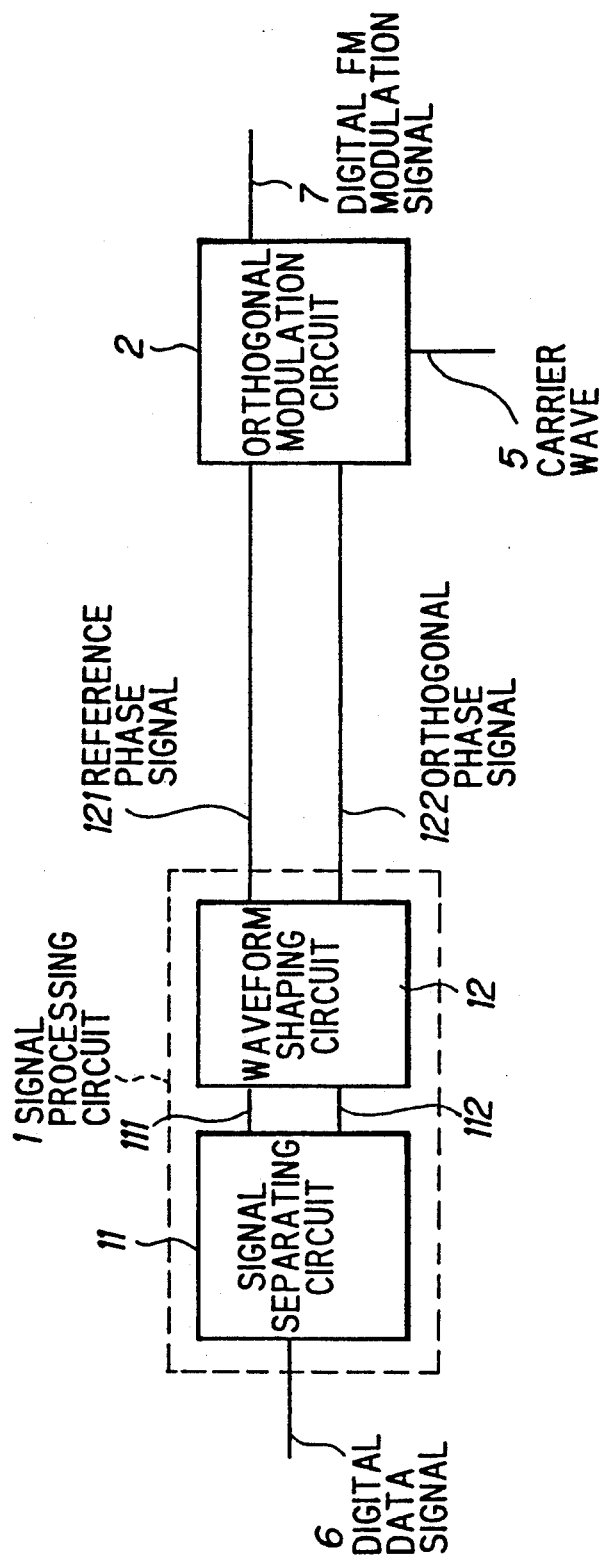
FIG. 1 is a block diagram showing a conventional apparatus for FM-modulation of digital data signals.

FIG. 1 shows the conventional apparatus for FM-modulation of digital data signals which comprises a signal processing circuit 1 and an orthogonal modulation circuit 2. The signal processing circuit 1 comprises a signal separating circuit 11 and a waveform shaping circuit 12.

Figure 2:
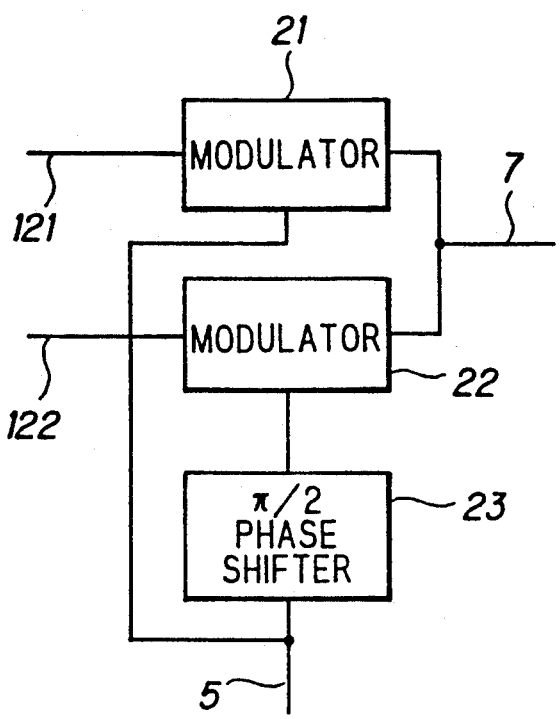
FIG. 2 is a block diagram showing an orthogonal modulation circuit used in FIG. 1.

FIG. 2 shows the orthogonal modulation circuit 2 which comprises first and second modulators 21 and 22, wherein a $\pi/2$ phase shifter 23 is connected to the second modulator 22.

In operation, a digital data signal 6 is supplied to the signal separating circuit 11, so that two separated digital data signals 111 and 112 are supplied therefrom to the waveform shaping circuit 12, in which the digital data signals 111 and 112 of a rectangle waveform are filtered to provide reference and orthogonal phase signals 121 and 122. In the signal separating circuit 11, logic processing such as the differential conversion, the prohibition processing for a specified data input, etc. are carried out simultaneously, and, in the waveform shaping circuit 12, the two digital data signals 111 and 112 are processed, such that MSK, GMSK modulations, etc. are realized in the orthogonal modulation by the structure of filters.

In the orthogonal modulation circuit 2, a carrier wave signal 5 is divided into first and second carrier wave signals. The first carrier wave signal is modulated in the first modulator 21 by the reference phase signal 121, while the second carrier wave signal is phase-shifted in the $\pi/2$ phase shifter 23 by $\pi/2$, and the phase-shifted carrier wave signal is modulated in the second modulator 22 by the orthogonal phase signal 122. Thus, the two modulation signals supplied from the first and second modulators 21 and 22 are combined to provide a digital FM-modulation signal 7.

Figure 3:
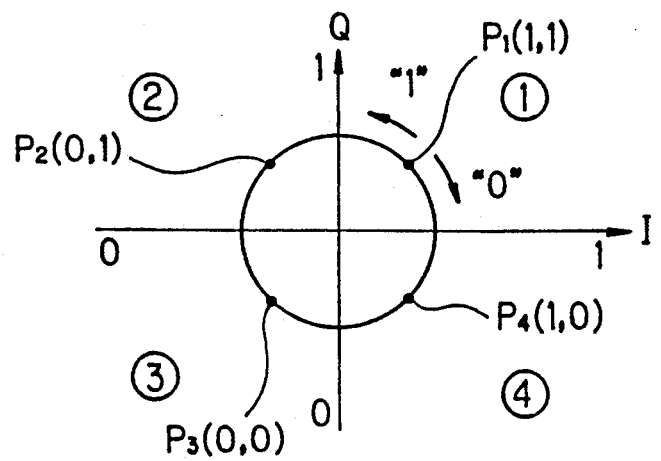
FIG. 3 is an explanatory diagram showing a phase plane in modulation operation.

In the FM-modulation such as MSK modulation, a phase of data "1" is rotated in counter-clockwise direction to lead the phase, thereby increasing a frequency thereof, while a phase of data "0" is rotated in clockwise direction to lag the phase, thereby decreasing a frequency thereof, respectively, as shown in FIG. 3.

Figure 4:
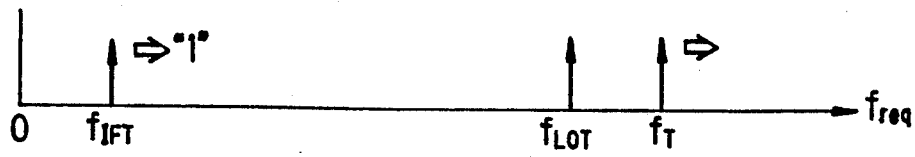
FIGS. 4 to 7 are explanatory diagrams showing frequency arrangements in the modulation and demodulation of digital data signals.
Figure 5:
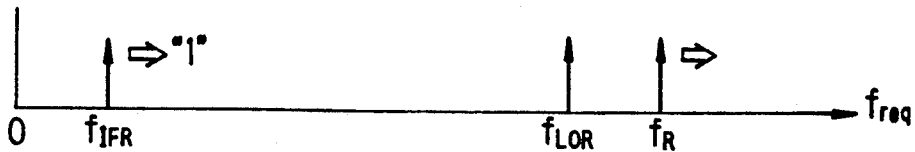

In general, modulation and demodulation for radio communication are mostly carried out in IF band. For this purpose, frequency arrangements are adopted, as shown in FIGS. 4 to 7. In FIG. 4, FM-modulation signal "$f_{IFT}$" of IF band is converted in frequency to a digital FM-modulation signal "$f_T$" of RF band by a local signal "$f_{LOT}$" of RF band. Here, it is assumed that "$f_{IFT}$" is 90 MHz, "$f_{LOT}$" is 900 MHz, and "$f_T$" is 990 MHz. As described in FIG. 3, "$f_{IFT}$" shifts in the higher direction of frequency for data "1", so that "$f_T$" also shifts in the higher direction of frequency to make a difference from "$f_{LOT}$" large. On the other hand, the signal "$f_T$" is received as a digital FM-modulation signal "$f_R$" on a receiving side, as shown in FIG. 5, so that "$f_R$" shifts in the same direction as "$f_T$" to make a difference from a local signal "$f_{LOR}$" large. As a result, a frequency-converted received FM-modulation signal "$f_{IFT}$" of IF band shifts in the higher direction of frequency, so that a received data is determined to be "1" on the receiving side.

Figure 6:
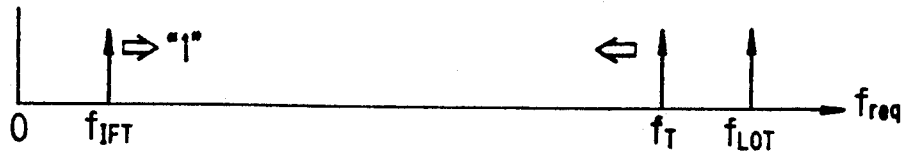
Figure 7:
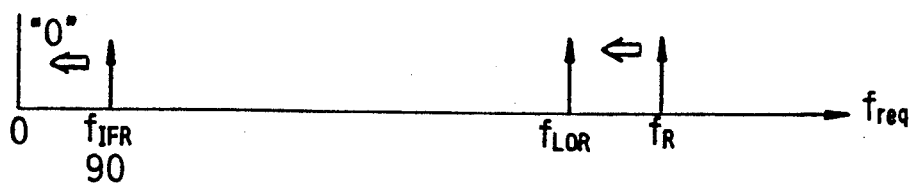

Next, if it is assumed on a transmitting side that "$f_{IFT}$" is 90 MHz, "$f_{LOT}$" is 990 MHz, and "$f_T$" is 900 MHz, as shown in FIG. 6, "$f_T$" shifts in the lower direction of frequency for data "1". On the other hand, if it is assumed on a receiving side that "$f_R$" is arranged to be higher than "$f_{LOR}$", as shown in FIG. 7, a received FM-modulation signal "$f_R$" shifts in the lower direction of frequency, so that a frequency-converted received FM-modulation signal "$f_{IFR}$" shifts in the lower direction of frequency. As a result, a received data is erroneously determined to be "0" on the receiving side.

As explained above, a demodulated data is inverted in case where the arrangement of local signals "$f_{LOT}$" and "$f_{LOR}$" is different between the transmitting and receiving sides. This disadvantage occurs for the reason that a frequency arrangement is not specified on a receiving side, and a modulation system and a frequency conversion system are arbitrarily combined on a transmitting side. For this reason, it is impossible that a system is set up to provide no inversion of frequency arrangements between transmitting and receiving sides, or to invert an input signal supplied to a modulation apparatus in advance.

Next, a problem occurring in a practical use of the apparatus for FM-modulation of digital data signals will be explained. Here, it is assumed that this modulation apparatus is applied to a time-division multiplexing communication system in which data are transmitted in a burst manner. In such an application, a radio transmitter is connected at a rear stage to the modulation apparatus, such that input data are supplied to an input of the modulation apparatus in a burst manner, and transmitting signals rise at an output of the radio transmitter in a burst manner at the time of starting operation. In this operation, no modulation is carried out to transmit signals at the rising time, thereby avoiding the unnecessary expansion of spectrum.

For this purpose, serial bits such as a predetermined number of "0s" corresponding to a predetermined time necessary for the rise of the transmitter are added as a start bit signal to a front portion of the burst-like data supplied to the input of the modulation apparatus. During a period equal to the presence of the start bit signal, the prohibition processing in which no modulation is carried out in the modulation apparatus is realized. For this purpose, the start bit signal is detected in the signal separating circuit 11 of the modulation apparatus as shown in FIG. 1.

In case where data are inverted at the input of the modulation apparatus to avoid the data inversion on the receiving side, the start bit signal becomes impossible to be discriminated from transmitting signals. As a result, a problem in which the prohibition processing is not conducted may occur. In addition, a further problem in which unnecessary transmission spectrum is generated to apply disturbance on other systems occurs. For these problems, two kinds of modulation apparatus having different logic processings must be prepared in case where a system is structured by combination with a frequency conversion apparatus having a different frequency arrangement. This system structure results in an economical disadvantage.

Next, an apparatus for FM-modulation of digital data signals in a first preferred embodiment according to the invention will be explained in FIG. 8, wherein like parts are indicated by like reference numerals as used in FIG. 1. This FM-modulation apparatus further comprises an inverting circuit 3 and a switch-over circuit 4 in addition to the structure of the conventional FM-modulation apparatus as shown in FIG. 1.

In operation, a digital data signal 6 is supplied to the signal separating circuit 11 to be divided into two digital data signals which are then shaped in the waveform shaping circuit 12 to provide I and Q signals 121 and 122. The I signal 121 is divided into two I signals, one of which is supplied to the inverting circuit 3 to provide an inverted I signal 23, and the other of which is supplied to the switch-over circuit 4. In the switch-over circuit 4, the I signal 121 is selected in case of the frequency arrangement as shown in FIG. 4, and the inverted I signal 123 is selected in case of the frequency arrangement as shown in FIG. 6.

Thus, the aforementioned frequency shift of RF band is not affected by the frequency arrangement, so that a frequency shifts in the higher direction of frequency for data "1" without any dependency of a relation between local and transmission frequencies. As a result, the data inversion is avoided.

FIG. 9 shows a data row of a vector A each bit assigned to each time slot as indicated by (a). The vector A is a data row which has already been subject to data processing.

With reference again to FIG. 3, if it is assumed that an initial value $P_1$ is positioned in the first quadrant (1), a phase shifts in the leading direction to the second quadrant (2) at the time slot "1", because the vector /A is "1" at this time slot. That is, considering the change of "P(I,Q)", "$P_1(1,1)$" at the time slot "0" shifts to $P_2(0,1)$" at the time slot "1".

Such changes are understood in FIG. 9 as indicated by (b). Here, if only I signals are inverted to provide $\bar{I}$ signals, the combination of $\bar{I}$ and Q signals is obtained in FIG. 9 as indicated by (c). Considering the change of "P(I,Q)" between the first and second time slots "1" and "2", "P(1,1)" changes to "P(0,1)". This change is in counter clockwise direction, so that digital data is "1". In this manner, a data row of a vector B which is equal to the inversion of the vector /A is obtained in FIG. 9 as indicated by (d). In such a manner, the inversion of data occurring in RF band is avoided.

Figure 8:
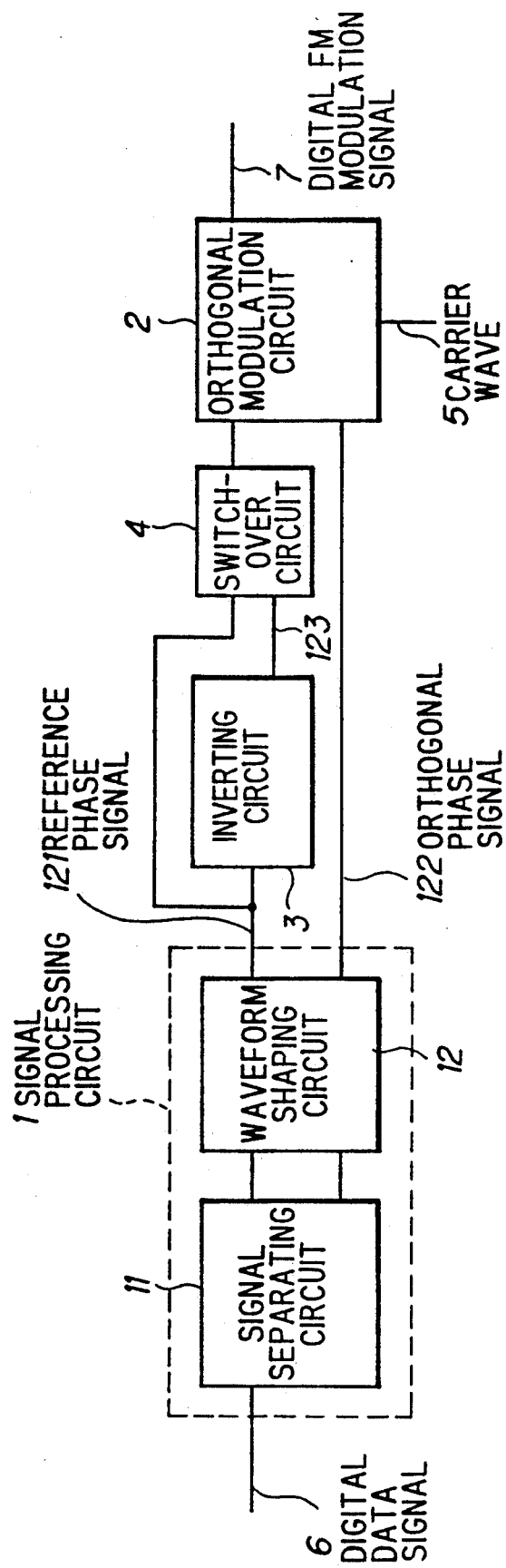
FIG. 8 is a block diagram showing an apparatus for FM-modulation of digital data signals in a first preferred embodiment according to the invention.
Figure 10:
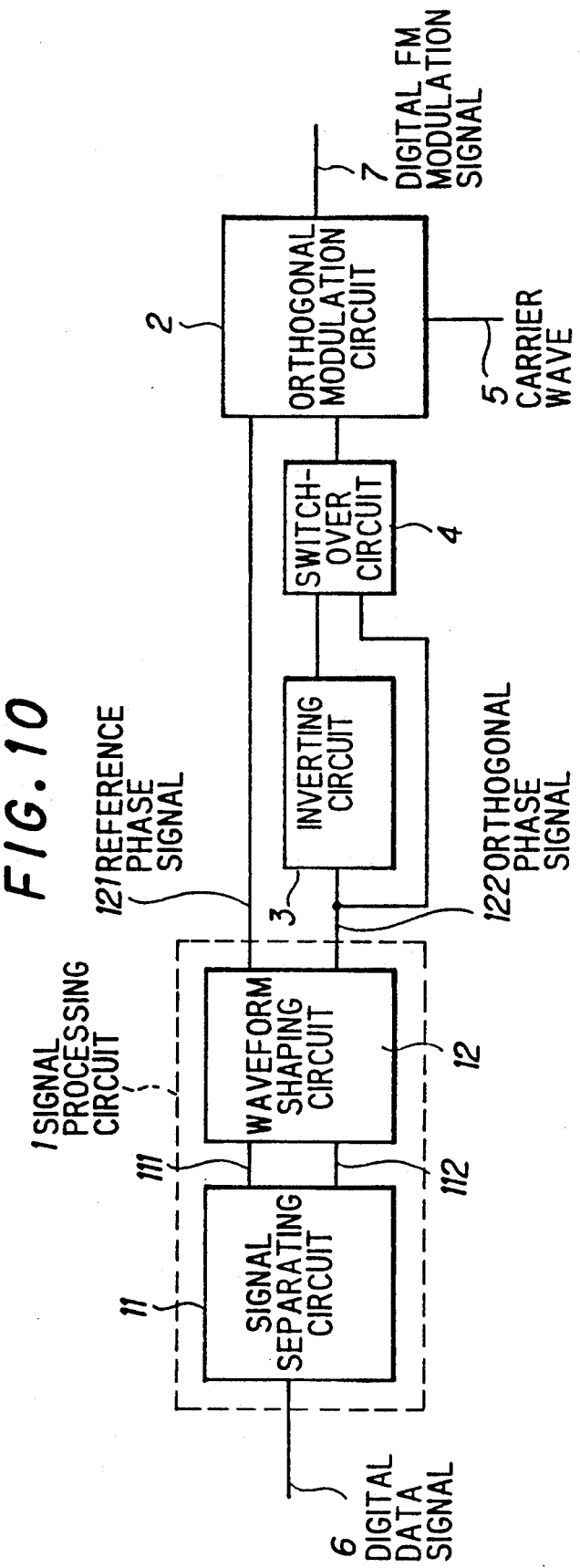
FIG. 10 is a block diagram showing an apparatus for FM-modulation of digital data signals in a second preferred embodiment according to the invention.

FIG. 10 shows an apparatus for FM-modulation of digital data signals in a second preferred embodiment according to the invention, wherein like parts are indicated by like reference numerals as used in FIG. 8. The difference between the first and second preferred embodiments is found in that the inverting circuit 3 and the switch-over circuit 4 are positioned on the signal line of the orthogonal phase signal 122 between the waveform shaping circuit 12 and the orthogonal modulation circuit 2 in the second preferred embodiment.

In the explanation in the first preferred embodiment, the I and Q signals are replaced, respectively, by the other, so that the inversion of digital data is avoided in RF band even in the second preferred embodiment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An apparatus for FM-modulation of digital data signals, comprising:
    means for supplying reference and orthogonal phase signals by receiving an input digital data signal;
    means for inverting said reference phase signal to provide an inverted reference phase signal;
    means for selecting one signal from said reference phase signal and said inverted reference phase signal; and
    means for FM-modulating a carrier wave signal by said one signal and said orthogonal phase signal to provide an FM-modulated digital data signal;
    wherein said one signal is said reference phase signal in case where an arrangement of a local frequency is the same between transmitting and receiving sides, and said one signal is said inverter reference phase signal in case where said arrangement is different between said transmitting and receiving sides.

2. An apparatus for FM-modulation of digital data signals, according to claim 1, wherein:
    said supplying means, comprises:
    a signal separating circuit for separating said input digital data signal into first and second digital data signals; and
    a waveform shaping circuit for converting said first and second digital data signals to said reference and orthogonal phase signals in accordance with a shaping of said first and second digital data signals;
    said FM-modulating means, comprises:
    a phase shifter for phase-shifting a carrier wave signal by $\pi/2$ to provide a phase shifted carrier wave signal;
    a first modulator for FM-modulating said carrier wave signal by said one signal to provide a first FM-modulated signal; and
    a second modulator for FM-modulating said phase shifted carrier wave signal by said orthogonal phase signal to provide a second FM-modulation signal;
    said first and second FM-modulation signals being combined to provide said FM-modulated digital data signal.

3. An apparatus for FM-modulation of digital data signals, comprising:
    means for supplying reference and orthogonal phase signals by receiving an input digital data signal;
    means for inverting said orthogonal phase signal to provide an inverted orthogonal phase signal;
    means for selecting one signal from said orthogonal phase signal and said inverted orthogonal phase signal; and
    means for FM-modulating a carrier wave signal by said reference phase signal and said one signal to provide an FM-modulated digital data signal;
    wherein said one signal is said orthogonal phase signal in case where an arrangement of a local frequency is the same between transmitting and receiving sides, and said one signal is said inverted orthogonal phase signal in case where said arrangement is different between said transmitting and receiving sides.

4. An apparatus for FM-modulation of digital data signals, according to claim 3, wherein:
    said supplying means, comprises:
    a signal separating circuit for separating said input digital data signal into first and second digital data signals; and
    a waveform shaping circuit for converting said first and second digital data signals to said reference and orthogonal phase signals in accordance with a shaping of said first and second digital data signals;
    said FM-modulating means, comprises:
    a phase shifter for phase-shifting a carrier wave signal by $\pi/2$ to provide a phase shifted carrier wave signal;
    a first modulator for FM-modulating said carrier wave signal by said reference phase signal to provide a first FM-modulated signal; and
    a second modulator for FM-modulating said phase shifted carrier wave signal by said one signal to provide a second FM-modulated signal;
    said first and second FM-modulated signals being combined to provide said FM-modulated digital data signal.

* * * * *